United States Patent [19]
Crosetto et al.

[11] Patent Number: 4,795,936
[45] Date of Patent: Jan. 3, 1989

[54] DRIVEN ROTARY SHAFT SYSTEM USING PERMANENT MAGNETS

[75] Inventors: John J. Crosetto, Orland Park; Kent L. Earle, Woodridge; Anthony D. Jordan, Barrington Hills, all of Ill.

[73] Assignee: Midwest Dynamometer & Engineering Co., River Grove, Ill.

[21] Appl. No.: 104,337

[22] Filed: Oct. 2, 1987

Related U.S. Application Data

[63] Continuation-in-part of Ser. No. 900,398, Aug. 26, 1986.

[51] Int. Cl.$^4$ ............................................. H02K 21/14
[52] U.S. Cl. .................................... 310/156; 310/218; 310/261
[58] Field of Search ................... 310/46, 49, 156, 218, 310/256, 261, 269

[56] References Cited

U.S. PATENT DOCUMENTS

| | | | |
|---|---|---|---|
| 3,394,295 | 7/1968 | Cory | 310/156 |
| 3,471,725 | 10/1969 | Moret et al. | 310/156 |
| 3,991,332 | 11/1976 | Kawamura | 310/162 |
| 4,110,646 | 8/1978 | Rao | 310/156 |
| 4,486,679 | 12/1984 | Jones | 310/156 |

FOREIGN PATENT DOCUMENTS 576012  8/1924  France ................. 310/156

OTHER PUBLICATIONS

Jeumont-Schneider, "High Power Adjustable Drive with Synchronous Motor", *Power Conversion International*, Sep.–Oct. 1979, pp. 83–94.

Primary Examiner—Patrick R. Salce
Assistant Examiner—D. L. Rebsch
Attorney, Agent, or Firm—Laff, Whitesel, Conte & Saret

[57] ABSTRACT

A driven rotary shaft system has a rotor including a core with a generally cylindrical surface, made from a stack of circular laminates of magnetic material which are clamped together in alignment. Permanent magnets are mounted in aligned windows formed in each laminate near diametrically opposed pole pieces for providing at least a pair of magnetic fields in positions which interact with magnetic fields of an adjacent stator. The permanent magnets and the windows have an arcuate cross section generally corresponding to the contours of the generally cylindrical surface. At least a pair of opposed air gaps are formed on diametrically opposed sides of the core, and between said pole pieces. These air gaps have internal concave contours which follow, correspond, and conform to the contours of flux lines produced by said permanent magnets. In one embodiment, the air gaps are completely within the perimeter of the circular laminates. The portions of the cylindrical surface which are between the air gaps form the pole pieces for said rotor. The portions over the air gaps form an aerodynamically smooth shape, containing a limited amount of the laminate material in order to limit magnetic flux therein.

9 Claims, 7 Drawing Sheets

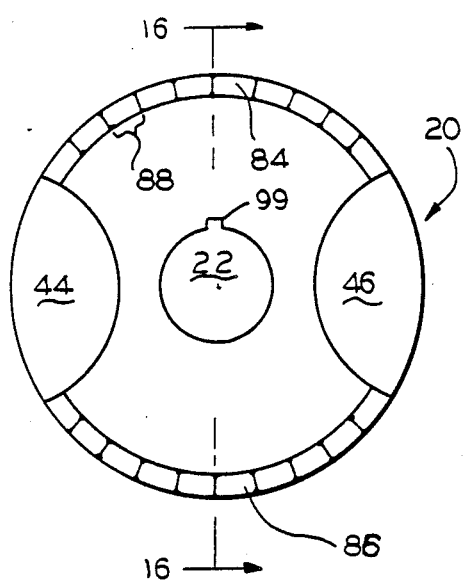
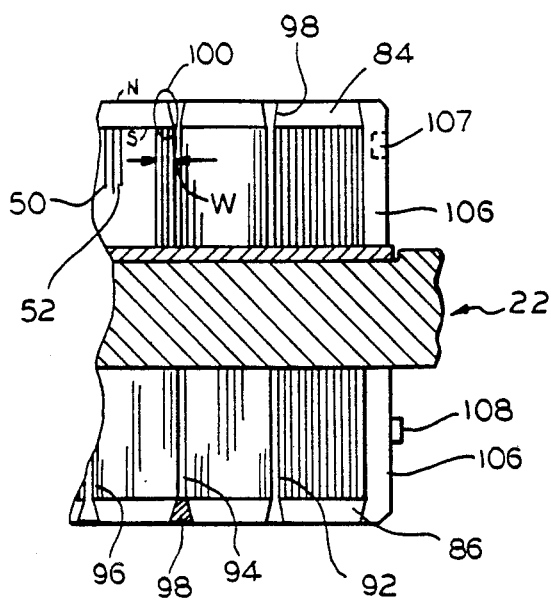
FIG.16
FIG.17
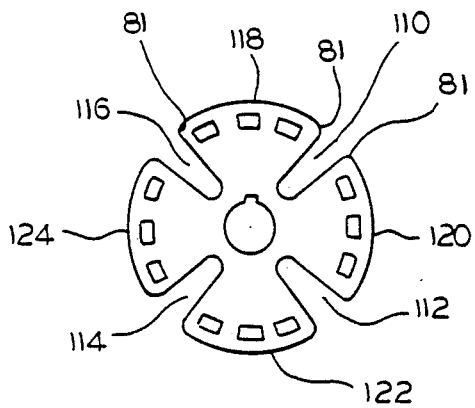
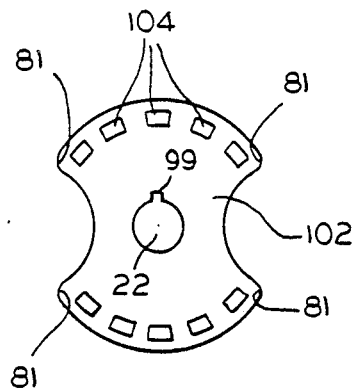
FIG.19
FIG.18
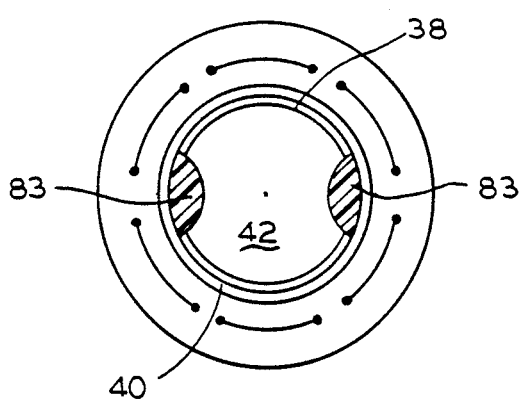
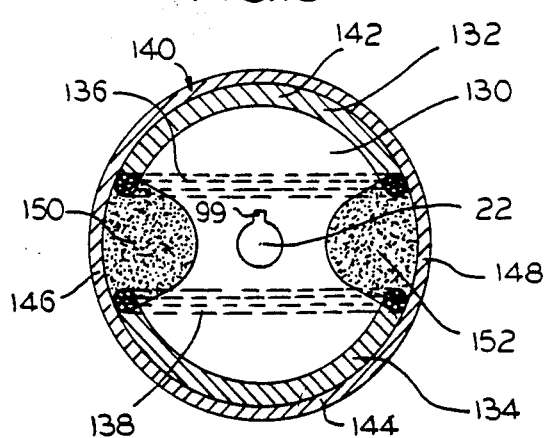
FIG.15
FIG.20

MAGNETIC PROPERTIES OF NEOMAX MAGNETS

|  |  | UNITS | NEOMAX-35 | NEOMAX-30 | NEOMAX-27 | NEOMAX-30H | NEOMAX-27H |
|---|---|---|---|---|---|---|---|
| Residual Flux Density 1kG = 0.1T | Br | kG | 11.8~12.5 | 11.2~11.9 | 10.5~11.2 | 11.2~11.9 | 10.5~11.2 |
| Coercive Force 1kOe = 79.6kA/m | BHC | kOe | 9.5~11.5 | 8.5~10.5 | 8.5~10.0 | 9.3~10.8 | 8.5~10.2 |
|  | IHC | kOe | 10.0~13.0 | 10.0~13.0 | 9.0~13.0 | > 17 | > 17 |
| Maximum Energy Product (BH)max 1MGO = 7.96kJ/m | | MGO | 33~36 | 28~31 | 25~28 | 29~32 | 25~28 |
| Optimum Operating Point | B/H | --- | 1.1 | 1.1 | 1.1 | 1.1 | 1.1 |
| Recoil Permeability | μrec | --- | 1.05 | 1.05 | 1.05 | 1.05 | 1.05 |
| Net Effective Magnetizing Force | Hs | kOe | > 20 | > 20 | > 20 | > 20 | > 20 |
| Temperature Coefficient of Br | α | %/°C | -0.126 | -0.126 | -0.126 | -0.123 | -0.123 |

FIG. 21

DRIVEN ROTARY SHAFT SYSTEM USING PERMANENT MAGNETS

This is a continuation-in-part of Ser. No. 06/900,398, filed Aug. 26, 1986.

This invention relates to driven rotary shaft systems and, more particularly, to rotors having permanent magnets mounted thereon, especially for use in motors, generators, dynamometers and combinations thereof.

An axial rotor of the type described herein, may find many uses in many machines, such as motors, generators, dynamometers, and combinations thereof, including motor/generators, motor/dynamometers, and the like. For convenience of expression, the following specification will generically refer to "rotors" and to "dynamometers"; however, it should be understood that these references are intended to cover all similar and suitable devices. Also, the following description is primarily set forth in terms of rotors having two pole pieces; however, it should be understood that the same principles may be expanded to cover any suitable number of pole pieces, as well as rotors having different diameters, or lengths.

An article giving general information on variable frequency drives for brushless d.c. motors which might use the inventive rotor is found in the magazine "*POWER CONVERSION INTERNATIONAL*", September/October, 1979, Pages 83–94. The article is entitled "High Power Adjustable Drive with Synchronous Motor", by R. Chauprade Jeumont-Schneider. Of course, the inventive rotor may also use many other forms of drives, including sine waves.

The specific device which the invention addresses is one wherein a rotor has a permanent magnetic field. A nearby stator has windings circumferentially distributed around the rotor to provide electrically created magnetic fields which interact with the fields of the permanent magnets. For example, a motor has windings which are energized in sequence to attract or repel the permanent magnets and thereby force the rotor to turn. A generator rotor is forcibly turned, and the fields of the permanent magnets generate an electrical current in the stator windings.

Heretofore, very little attention has been paid to matching a motor's characteristics to the characteristics of a variable speed drive. Furthermore, rotor shapes have been overlooked as a means for improving both rotors and motor/drive systems. In general, variable frequency drives have sourced rotors that were specifically designed to operate responsive to sinusoidal waveforms. Because of this, drives had to be overbuilt to ensure reliability, and thus became more costly than they otherwise would have been.

Accordingly, an object of this invention is to provide new and improved driven shaft systems. Here, an object of the invention is to provide rotors having a greater efficiency and an increased torque-to-mass ratio. Yet, another object of the invention is to provide rotors which turn smoothly and without pulsation.

Another object of the inventinn is to reduce the cost and improve the reliability of variable frequency drives for electric motors. Here, an object is to lower a rotor's reactance in order to reduce voltage stresses on components of an inverter, thus enabling a use of lower rated, lower cost devices, such as SCRs, transistors, diodes, capacitors, and the like.

Still another object is to increase the torque output without overexciting a rotor for a specific load. Thus, an object is to reduce the quadrature reactance of the rotor.

Yet another object is to increase the efficiency of an inverter at increased switching speeds. Here, an object is to reduce the rotor's reactance. Thus, another object is to direct and increase the rotor's flux density, thereby enabling a rotor to produce more torque with fewer stator coil turns.

A further object of the invention is to provide d.c. motors which faithfully respond to a variable speed drive controller. Here, an object is to follow drive pulses faithfully, despite fluctuations in the rate at which the pulses recur. Thus, an object is to provide an adjustable drive, d.c. motor, or the like.

Another object of the invention is to provide a driven shaft system which has a greatly improved horsepower-to-weight ratio. Here, an object is to provide such a system which has greater reliability, lower heat loss, and a better power factor.

Still, another object of the invention is to provide a driven shaft system with a higher starting torque, a higher pulling torque, and an increased effective back EMF.

Yet another object of the invention is to provide a driven, rotary shaft system which may find use as a pure motor, a pure generator, a pure dynamometer, a motor/generator, a motor/dynamometer, a motor/generator/dynamometer, or a similar device.

In keeping with an aspect of this invention, these and other objects of the invention are provided by a driven shaft system including a rotor having permanent magnets mounted on a core with opposed air gaps formed therein. Preferably, the permanent magnets are made of one of the newer materials providing an extremely high flux density, as compared to the best previously available permanent magnet materials. One example of such a new material is sold under the trademark "NEOMAX". The contour of the air gap follows the contour of naturally occurring flux lines.

A preferred embodiment ff the invention is shown in the attached drawings, wherein.

Figure 4:
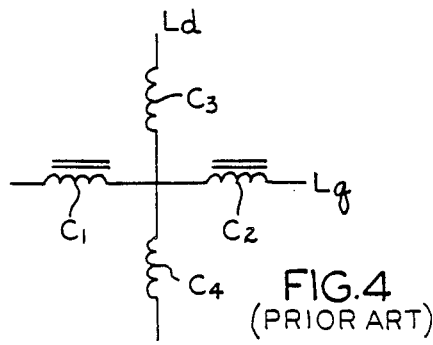
Figure 5:
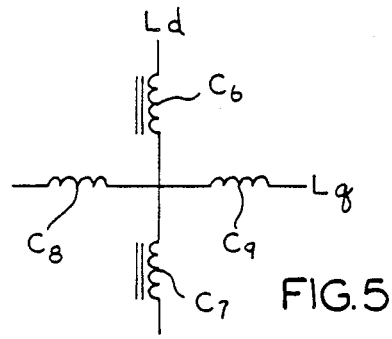
Figure 6:
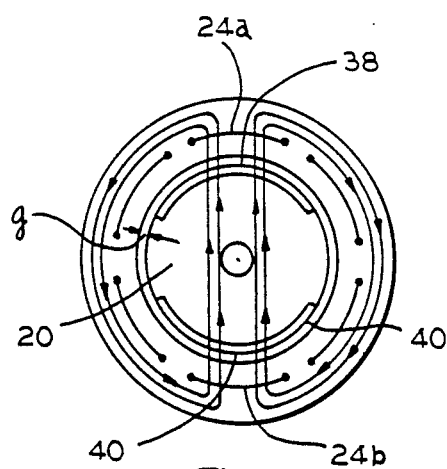
Figure 7:
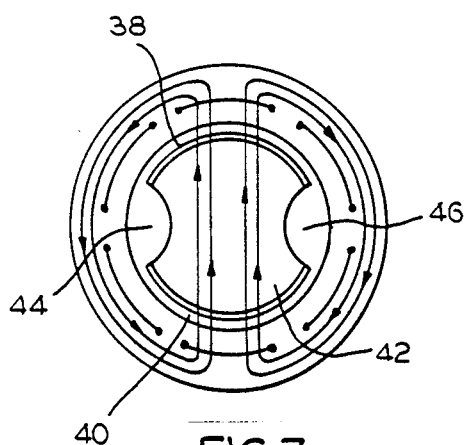
Figure 8:
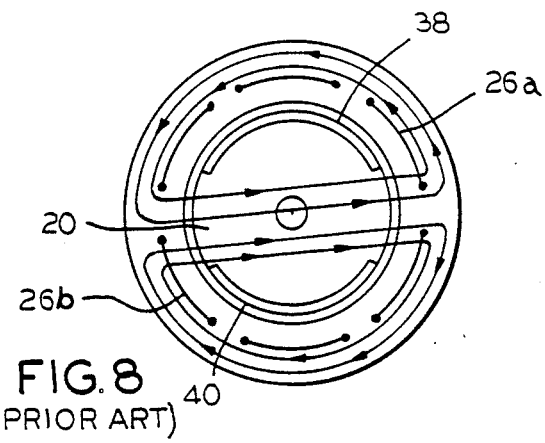
Figure 9:
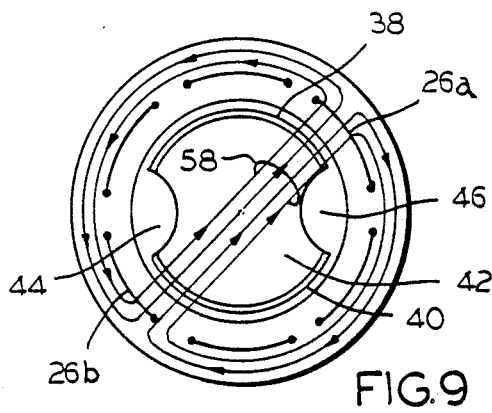
Figure 10:
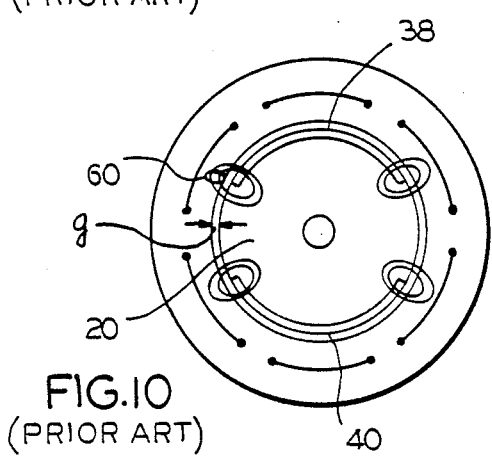
Figure 11:
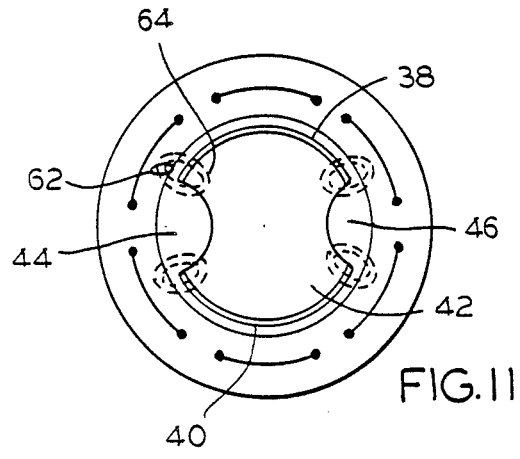
Figure 12:
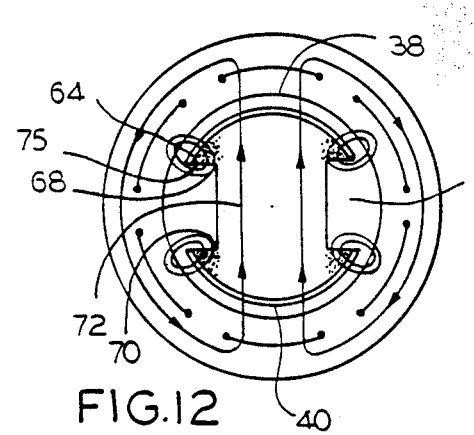
Figure 13:
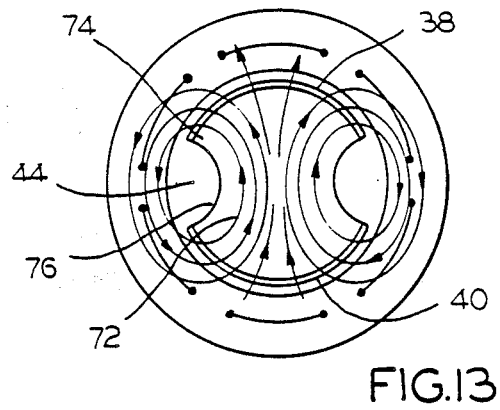
Figure 14:
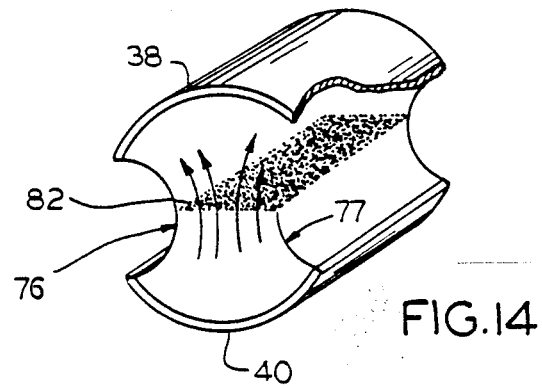
Figure 22:
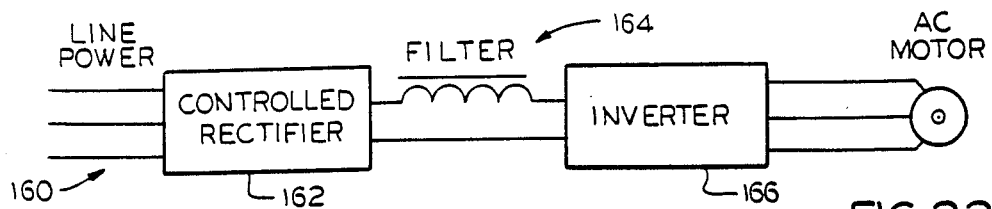
Figure 23:
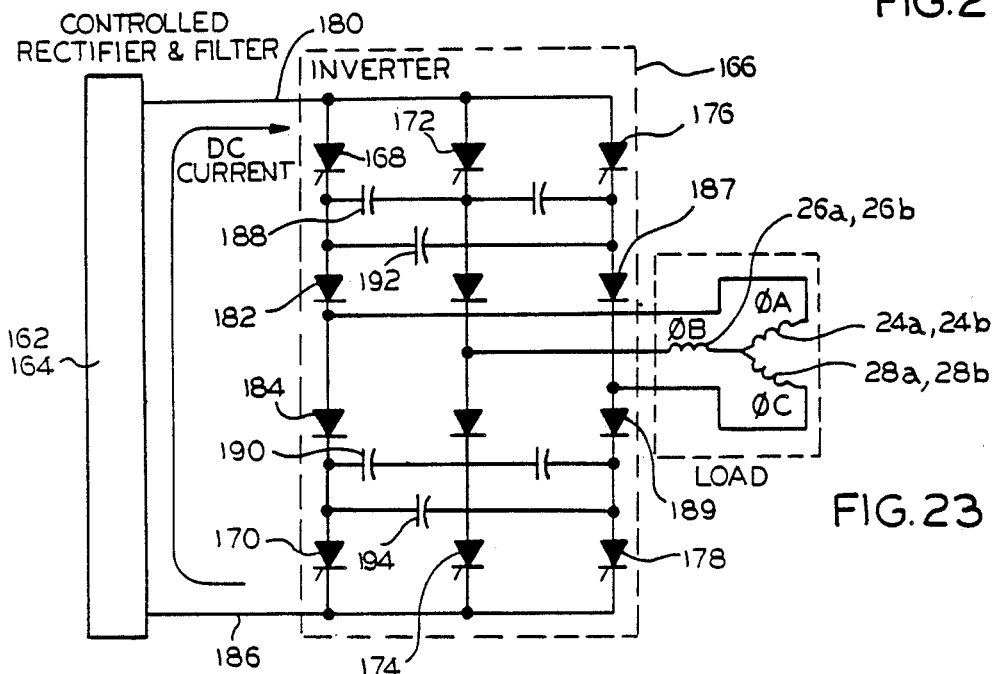
Figure 24:
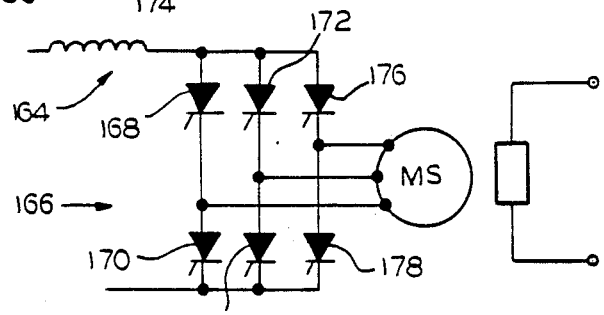
Figure 25:
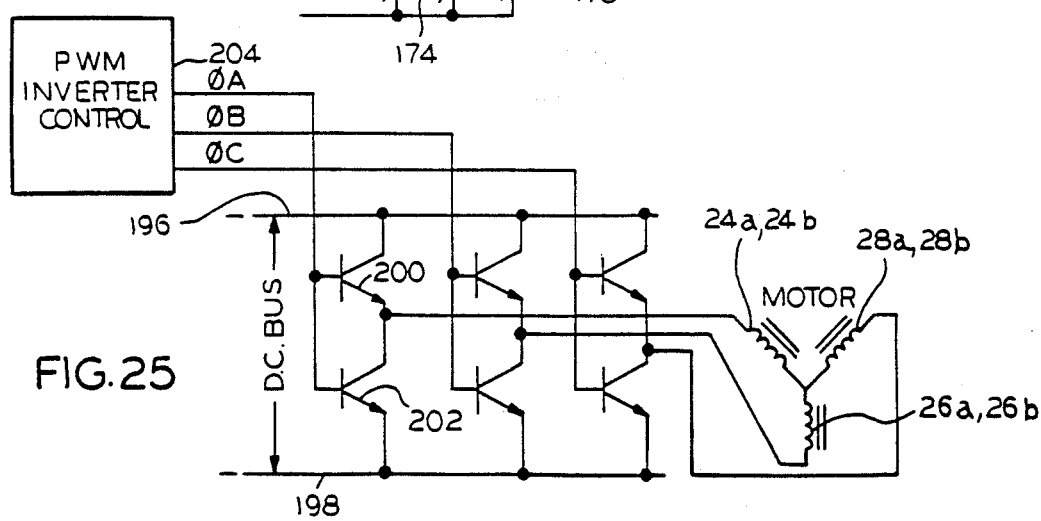
Figure 26:
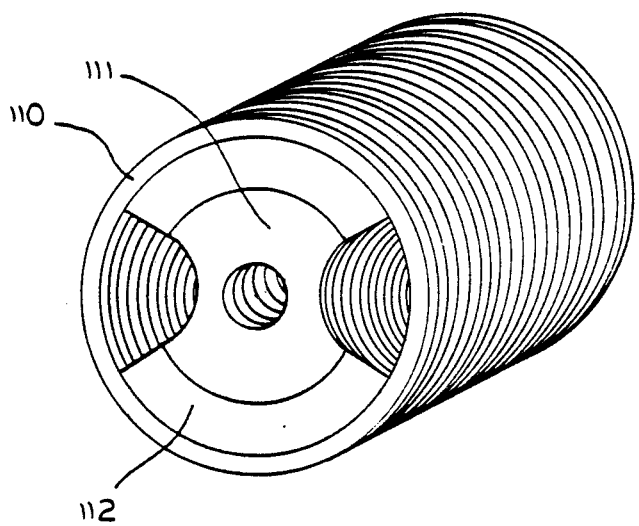
Figure 27:
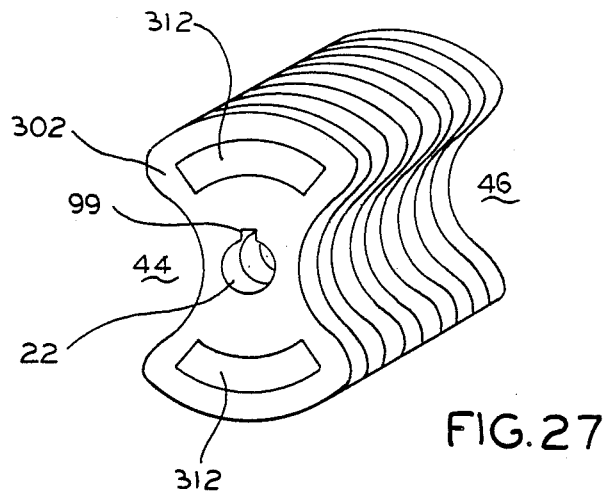
Figure 28:
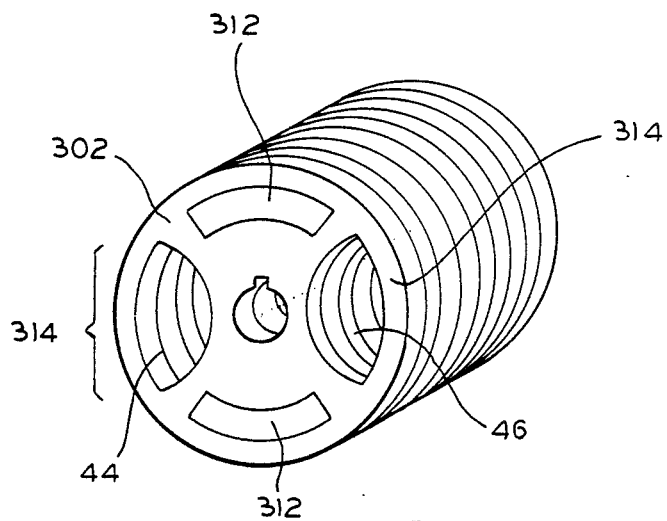

FIG. 4 schematically shows the poor efficiency resulting from the direct reactance vs. the quadrature reactance ratio of a prior art rotor;

FIG. 5 is a similar schematic showing of the improved efficiency resulting from the direct reactance vs. quadrature reactance ratio of the invention;

FIG. 6 is an end view showing the desired flux path between the rotor and stator with one pair of coils energized;

FIG. 7 is an end view similar to the view of FIG. 6 which shows how the flux is distributed in the inventive rotor with the same pair of coils energized;

FIG. 8 is a similar end view of the prior art which shows how flux is wasted when the rotor approaches the next set of stator coils to be energized;

FIG. 9 is similar to FIG. 8 and shows how the inventive rotor directs flux;

FIG. 10 shows fringing leakage flux in an end view of the prior art rotor;

FIG. 11 is similar to FIG. 10 and shows that there is a greatly reduced fringing leakage flux in the inventive rotor;

FIG. 12 shows non-efficient air gaps in a core which does not follow the teachings of the invention;

FIG. 13 is similar to FIG. 12; however, the air gaps do follow the teachings with a resulting increase in efficiency;

FIG. 14 is a perspective view of the inventive core with part of a pole piece broken away to show how magnetic saturation occurs to protect the permanent magnets against demagnetization;

FIG. 15 shows the inventive core with a non-magnetic material filling the air gaps to give a better aerodynamic shape;

FIG. 16 is an end view of a rotor showing how magnets are assembled onto an arcuate surface of a pole piece in a preferred embodiment of the invention;

FIG. 17 is a partial cross section of the rotor taken along line 17—17 of FIG. 16;

FIG. 18 is an end view of an alternative and less expensive embodiment showing how the rotor may be constructed with buried magnets;

FIG. 19 is an end view of a rotor having four pole pieces, to generically illustrate an inventive rotor with any suitable number of pole pieces;

FIG. 20 is a cross section of a preferred embodiment of the invention;

FIG. 21 is a table giving the magnetic properties of a preferred magnetic material;

FIG. 22 is a block diagram of an exemplary electronic drive circuit for the inventive rotor;

FIG. 23 is a conventional drive circuit which may be used to drive the inventive rotor;

FIG. 24 is a capacitorless drive circuit which has heretofore been primarily a theoretical possibility, but which may now be used as a practical drive for the inventive rotor;

FIG. 25 is a transistorized drive circuit for the inventive rotor;

FIG. 26 shows a rotor having an outer shell made of a stack of of laminate rings;

FIG. 27 shows, in perspective, a first embodiment of a configuration of core laminates and permanent magnets used to make the inventive rotor; and FIG. 28 shows, in perspective, a second embodiment of core laminates and permanent magnets used to make to inventive rotor.

FIG. 26 shows a stack of laminated rings 110 which make a containing tube over the magnets. The tube holds the magnets 112 on the inner laminated core 111. The laminates of both the core add ring reduce the eddy current losses in the rotor, thus increasing motor/generator efficiencies an also reducing the heat dissipation requirements of the machine.

Figure 1:
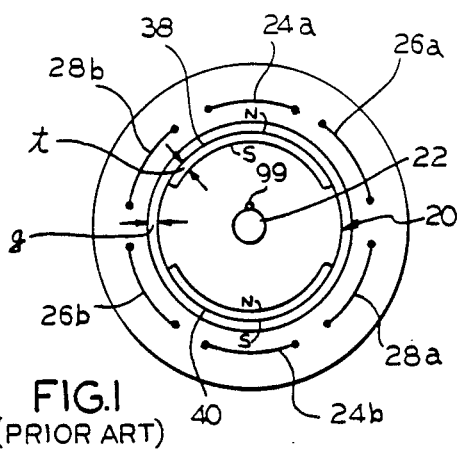
FIG. 1 is a schematic end view of a conventional rotor and its associated stator.
Figure 2:
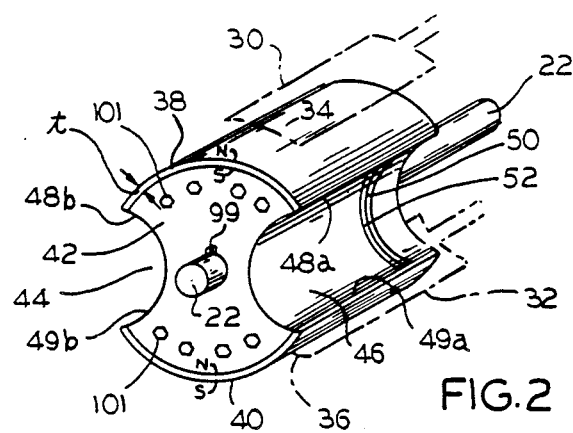
FIG. 2 is a perspective view of the inventive rotor.
Figure 3:
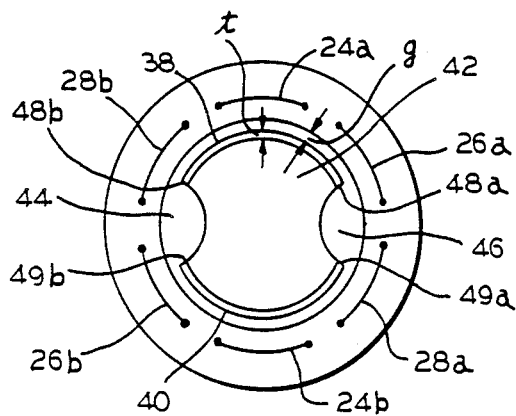
FIG. 3 is an end view of the inventive rotor, which may be compared with the prior art rotor of FIG. 1.

FIG. 1 is an end view of a rotor 20 mounted to turn a rotary shaft 22 responsive to conventional energizations of stator coil windings 24–28. Two (30, 32) of the stator coil windings are schematically shown by dashed lines in FIG. 2. The ends 34, 36 of the stator coils 30, 32 are the parts of the coils which are seen at 24a, 24b (for example) in FIGS. 1, 3 and elsewhere in the drawings.

The prior art rotor 20 of FIGS. 1, 6, 8, 10 is made of a stack of laminates, having a generally circular configuration, which are stacked one on the other to frrm a cylindrical body. A pair of diametrically opposed permanent magnets 38, 40 are mounted on diametrically opposed arcuate areas of the cylindrical outer surface of the rotor. The magnets are polarized in the thickness dimensions, as shown by the letters "N" and "S" in the drawings. Thus, when stator windings 24a, 24b are energized simultaneously, a field of magnetic flux is electrically generated with a polarity which repels (or attracts) the permanent magnets 38, 40. As is conventional, the rotor 20 turns on its axis to align itself so that the fields of permanent magnets 38, 40 are driven by the fields of the energized coils 24a, 24b. However, before the rotor can so align the permanent magnets, coils 24a, 24b are deenergized and the next set of coils 26a, 26b are energized or fired. Again, the rotor turns to align the fields of the permanent magnets 38, 40 with the fields of stator coils 26a, 26b. Again, before the rotor can align these fields, the coils 26a, 26b are denergized and coils 28a, 28b are energized. Thus, in a conventional manner, rotor 20 turns continuously as its permanent magnets 38, 40 chase the fields of the energized stator coils, without ever fully catching up with the shifting stator coil fields.

Also, as is conventional, FIG. 1 shows a cylindrical core having curved pole pieces with permanent magnets 38, 40 mounted thereon and following the arcuate surface areas of the cylinder. As will become more apparent, this core configuration leads to a wasteful and inefficient use of the permanent magnetic flux.

According to the invention, the core 42 is cutout in the diametrically opposing areas 44, 46 to provide relatively larger air gaps between the rotor core and pole pieces for stator coil windings as compared with the air gaps between the permanent magnets 38, 40 and the pole pieces for the stator coil windings. Preferably, the core 42 is made from soft iron laminates, two of which are seen at 50, 52, which are stacked one or the other to form the entire length of the core 42. The thickness t of the permanent magnet also behaves as an air gap between the rotor and the stator. The invention requires the air gaps 44, 46 to be much larger than the air gap t formed by the thickness of the magnet plus the space g between the magnet and the stator pole pieces. This is opposite to the conventional configuration (FIG. 1) where the air gap g between the core and the stator pole pieces is less than the air gap represented by the thickness t of the permanent magnets 38, 40 plus any space between pole pieces of the stator and rotor.

The laminates forming core 42 are keyed and affixed to the shaft 22, so that they turn as a unit. Therefore, the shaft 22 turns in unison with core 42 as the magnets 38, 40 chase the coil fields around the stator.

FIGS. 4, 5 show the constructions of the conventional and inventive rotors, respectively, by means of equivalent electrical circuits. The permanent magnets 38, 40 behave as air gaps behave. In the prior art rotor (FIG. 1), the reactance $L_d$ at the direct air gap of the magnet is as wide as the thickness t of the magnet itself plus the width of the rotor-to-stator gap g. The reactance $L_q$ at the quadrature air gaps on the sides of the core 20 is only the width of the gap g, in the prior art of FIG. 1. Therefore, as shown in the prior art equivalent circuit FIG. 4, the quadrature reactance $L_q$ behaves as two coils $C_1$, $C_2$ with iron cores and the direct reactance $L_d$ behaves as two coils $C_3$, $C_4$ with air cores. Since iron cores enable coils to switch slower, the quadrature gaps of width g tend to make the coil which is next to be energized come on slower, as compared to the response time of the coils next to the direct gaps $t+g$.

As shown in FIG. 5, the direct reactance $L_d$ behaves as coils $C_6$, $C_7$ with iron cores because the air gaps 44, 46 are much wider than the gaps t+g. For a similar reason, the quadrature reactances $L_q$ behave as coils $C_8$, $C_9$ with air cores. Thus, the invention is much more efficient because the direct gap has only the relatively small width of gap g+gap t, while the quadrature gap has the relatively wide width of gaps 44, 46. This time, the slower coils $C_6$, $C_7$ with iron cores appear in the direct reactance gaps, where they belong and the quicker switching air core coils $C_8$, $C_9$ appear in the quadrature gaps 44, 46 where they belong.

The remainder of the figures show how the new air gaps improve the efficiency of the motor. In greater detail, FIGS. 6 and 7 show that the prior art and the invention are equally efficient and the flux distribution is about the same when the magnets 38, 40 are standing directly opposite an energized set of stator coils 24a, 24b. The large inventive air gaps 44, 46 (FIG. 7) play no significant role at this time.

However, when the next set of coils 26a, 26b are energized (FIGS. 8 and 9) with the rotor out of position, the conventional rotor 20 (FIG. 8) encounters a situation where the air gap between the core and the stator is smaller than the air gap at the magnets since the thickness of a permanent magnet acts as an air gap, and since there is no air gap corresponding to the magnets in the core material between the magnets. Therefore, the flux 56 (FIG. 8) is diverted from a path through the magnets 38, 40 to a path through the core 20, with a waste of energy that produces no mechanical torque. This wasted flux is called a "quadrature leakage path".

The distribution of the flux in the inventive rotor (FIG. 9) is quite different at the corresponding instant when the next set of coils 26a, 26b are first energized in the inventive device. The width of the inventive air gaps 44, 46 at the parts of the core which confront the stator windings are much larger than the width of the air gaps formed by the thickness of the magnets 38, 40. Therefore, substantially all of the flux 58 passes through the magnets 38, 40. There is virtually none of the quadrature leakage through the core that is shown in FIG. 8. Since there is practically no quadrature leakage, the inventive rotor (FIG. 9) has a much greater efficiency as compared to the efficiency of the prior art rotor (FIG. 8).

FIGS. 10, 11 compare the fringing flux leakage at the ends of the magnets 38, 40. In the prior art (FIG. 10), the core material surrounds the ends of the magnets. The small width of air gaps g between the rotor and the stator provides an efficient path for enabling a fringing flux 60 to appear freely, at the edges of the magnets and across the gap between the stator and rotor. This flux 60 acts as a drag on the rotor 20 and also reduces the amount of usable flux. In the inventive rotor (FIG. 11), the air gaps 44, 46 are so large that there is no efficient fringing path; thus, comparative little fringing flux leaks around the ends of the magnets, as is indicated by dashed lines at 62.

Since the tips of the core (as at 64 (FIG. 12), for example) having a poorly designed air gap tend to saturate, care should be taken in shaping the air gaps. For example, suppose that the poorly designed air gaps 65 are rectangular in cross section and tend to have relatively sharp internal corners, as shown at 68, 70 in FIG. 12. The tips 64 of the core contain a greatly reduced amount of core material. Magnetic flux tends to behave somewhat as water behaves, spreading uniformly over a path with a minimum length. Therefore, the tips 64 in FIG. 12 behave a little like a basin might behave if placed in such a location, which would tend to capture stagnent back water. Since the tips 64 have a small volume, they quickly go into magnetic saturation, much as a small basin of this shape would tend to quickly fill with back water.

The flux lines 72 in the inventive core (FIG. 13) do not tend to spread into the tip 74 and cause magnetic saturation because there is no square corner, as at 68, 70 (FIG. 12), and because there is no core material, as at 64, which is isolated behind a barrier gap wall, as at 75. Instead, flux lines 72 form a smooth contour around the wall of gap 44. This means that each of the four tips, such as 74 in the inventive core, is more or less in the flux path and, therefore, does not easily go into magnetic saturation.

The saturation of the tips 64 at the poorly designed air gap (FIG. 12) reduces the effective widths of the magnets 38, 40 and thereby eliminates much of the flux that would otherwise be available for the rotor operation. The non-saturation of tips 74 in a well designed air gap, retains the fully effective magnetic width and fully efficient operation.

Moreover, as seen at 81 in FIGS. 18, 19, the tips of the rotor may be rounded to eliminate points which might otherwise go into saturation. In this case, the area of magnetization is adjusted so that full energization without loss of flux is achieved.

Another consideration for the size and shape of the air gaps 44, 46 is that a maximum amount of metal should be removed to minimize the weight and inertia of the core, and yet a minimum amount of core material should be retained to insure a good and efficient operation. This raises an issue as to how small the narrow part of the core should be made. As shown in FIG. 14, the narrowest part 82 or minimum cross sectional area of the core is the place where saturation will occur first, if it is to happen. If the minimum area is made too small, it limits the amount of flux which can pass through the magnets. Therefore, the smallest cross sectional area 82 should be no smaller than that area which enables all of the available flux to pass through the magnets during a worst case of normal rotor operation. On the other hand, if the core should saturate under abnormal operating conditions, the first area to go into saturation is the minimum cross sectional area 82 at the center of the necked region formed by opposing air gaps. This saturation, in effect, cuts off the flux so that the magnets 38, 40 cannot be de-magnetized. Thus, the minimum area for cross sectional area 82 is that which enables rotor operation under a worst case of normal operations. The maximum area for cross sectional area 82 is that which goes into saturation to protect the magnetization, at the instant when unacceptable abnormal conditions first appear.

Means are provided for giving the core a better aerodynamic shape, to reduce noise and drag. The air gaps 44, 46 should be eliminated by filling them with almost any non-magnetic material. This could be done by the use of any of many different techniques, such as clamping a non-magnetic cylindrical shell around the rotor. Another way is to place the rotor in a mold which is then filled with a suitable potting compound. The final product (FIG. 15) would then be a rotor having a smooth plastic cylindrical shell, with a plastic material 83 completely filling gaps 44, 46.

A first method of mounting magnets 38, 40 around the periphery of the cylinder is shown in FIGS. 16, 17. A number of generally rectangular magnets (two of which are numbered 84, 86) are fastened to opposing arculate segments on the cylindrical surface of the rotor in order to form a mosaic which completely covers the magnetic surface. From FIG. 16, it will be observed that the bottoms of the magnets are flat, as seen at 88, and that they fit against flat facits on the surface of the cylinder so that they will not slip around the surface in a rotational direction, especially on sudden starts or stops.

A plurality of mounting discs 92-96 (FIG. 17) are distributed among the laminates, such as 50, 52. The discs are made of non-magnetic material to prevent fringing flux. The circumference of each mounting disc has a keystone shape, as indicated at 98. This keystone shape locks and holds the magnets 84, 86, etc., so securely in a preferred embodiment that the surface of the drum may be milled or otherwise formed into a smooth surface. The laminates and mounting discs are threaded onto a shaft 22 and locked into rotary position by a key 99. Then, bolts are passed through a number of apertures 101 (FIG. 1) in the laminates to lock them into position.

An advantage of the use of non-magnetic material for the mounting discs 92-96 is that there is no fringing of flux around the ends of the magnets. For example, if a fringing flux should appear, as shown at 100 (FIG. 17), the effective magnetic surface is reduced by the width W. The non-magnetic material of disc 94 tends to prevent this fringing and, therefore, eliminate most reduction in the effective magnetic width.

Another construction is shown in FIGS. 18, 19. Here, the laminates 102 are stamped with a number of holes formed along an arcuate path. As the laminates are being assembled, magnets 104 are placed in the holes. Or, alternatively, rods of magnetic material are inserted through the aligned holes of many laminates. Either way, bolts 101 (FIG. 1) clamp end plates 106 (FIG. 17) onto the ends of the rotor to hold the laminates in place. Then, the rotor is preferably potted in plastic to form a unitary cylindrical block which may rotate freely and without air drag or noise.

An advantage of this use of end plates 106 is that the rotor may be balanced by drilling holes 107 or attaching weights 108 without having to disturb the laminates. If holes are drilled in the laminates, it tends to defeat the purposes of providing a laminate.

FIG. 19 shows a rotor which is substantially the same as that shown in FIG. 18, except that, instead of two, there are four air gaps 110-116 and four magnetic pole pieces 118-124.

FIG. 20 gives a preferred method of providing a magnetic surface on a rotor having an aerodynamically shaped rotor. In greater detail, the laminates 130 of the core material are made, as described previously. The magnets 132, 134 are formed in any suitable manner, either as one large, arcuately shaped magnet or as a plurality of small magnets fitted into a suitable holder.

While the magnets 132, 134 and the rotor are being manufactured, it is preferable for them to be in a demagnetized state. Therefore, as a manufacturing tool, magnetizing coils 136, 138 are attached to the rotor core 130, in positions where they are able to produce magnetizing fields with the correct polarity in order to magnetize magnets 132, 134. After the manufacturing is completed, the coils 136, 138 may be cutoff. Or, they may be secured in place by a suitable potting compound. An advantage of so retaining the coils in place is that they may be used later, during repair, to demagnetize and remagnetize the magnets 132, 134. A cylindrical retainer tube 140 may be slipped over the magnets 132, 134 and core to hold them together. The retainer tube is made of four parts 142-148, which are welded together. Parts 142, 144 are made of a magnetic material. Parts 146, 148 are made of a non-magnetic material. The spaces forming air gaps 44, 46 spaces are filled with a non-magnetic material 150, 152, such as epoxy, aluminum, or the like. An advantage of this retainer tube is that the rotor may be driven at extremely high speeds, such as 20,000 RMP, or higher.

The preferred magnetic material has a relatively high level of magnetic energy and yet is made of a material which is soft enough to be shaped and formed on conventional metal working machinery. One example of such a material is available from SUMITOMO SPECIAL METALS CO., LTD., 22, Kitahama, 5-Chome Higashi-Ku, Osaka, Japan, which sells a number of different magnetic metals under the trademark "NEOMAX". The presently preferred metal is NEOMAX-35, although other of the NEOMAX metals have been used. FIG. 21 sets forth a table of the magnetic properties, which is published by the SUMITOMO company.

FIGS. 4, 5 explain a very important aspect of the invention which enables it to react faster and more positively. It may be recalled that the direct reactance $L_d$ behaves as iron core coils $C_6$, $C_7$ behaves because the gaps $g+t$ (FIG. 3) are small. The quadrature reactance $L_q$ behaves as an air core coil $C_8$, $C_9$ behaves because the air gaps 44, 46 are very wide as compared to the gaps $g+t$ at the poles. This means that the concentration of flux in gaps $g+t$ is great and that the concentration of the flux falls off quickly in the air gaps 44, 46. Therefore, as the rotor rotates, there are relatively sharp and distinct pulse-like response characteristics.

Accordingly, the design of the rotor provides a very fast reaction time which enables a synchronous commutation that gives an adjustable speed drive. Much has been said about such commutation; however, heretofore rotors have not had the response capabilities required to respond in time for such fast synchronous operation.

The variable speed, electrically driven d.c. motor without sliding contacts make it possible to solve the main problems which have been encountered, as follows:

1. Energy saving and flexibility of operation by adjustment of the speed of the process, instead of by throttling an engine.

2. Energy saving due to a higher efficiency as compared with gas or steam turbine drives—general applications to compressors and to certain types of pumps.

3. Elimination of commutators which, in general, are difficult to apply and to maintain in hazardous or corrosive atmospheres.

4. Elimination of disturbances due to current surges caused by motors which are supplied directly by the power network. It is possible to use a single converter assembly for starting various motors.

5. Decrease of noise in fans and heat exchangers by speed variation which occur responsive to changes in the temperature (for example, at night).

The faster action provided by the inventive rotor design also simplifies the drive circuit and, therefore, lowers its costs. Capacitors may be eliminated, and lower voltages may be used in the control circuit.

FIGS. 22-25 illustrate several drive circuits and help explain how an advantage may be taken of the invention. More particularly, the inventive rotor is particularly well suited for use in connection with an adjustable speed drive motor of the type described in the above-identified article by R. Chauprade Jeumont-Schneider. The electronic variable speed drives have advantages for industrial processes, such as performance, energy savings, decreased maintenance, higher rate of availability, etc.

In FIG. 22, a three phase power line 160 is connected to a controlled rectifier 162 of any suitable design. The output of rectifier 162 is filtered and smoothed at 164 to give a stable d.c. The inverter 166 then chops or interrupts the stable state d.c. to give a series of drive pulses which recur at a cyclic rate that regulates the speed of the motor. Thus, to give the motor a variable speed, it is only necessary to change the frequency of the drive pulses.

FIG. 23 shows details of the inverters 166, wherein there are three pairs of SCRs for energizing three windings responsive to each of the three phases of the line power current. The SCRs are switched on by a microprocessor, and they switch off when they starve for want of a holding current. These SCRs provide an artificial commutation.

In the area of artificial commutation, the SCRs firing "orders" are determined in two ways:

1. when starting torques are low, the orders of the firings are determined by the stator voltages of the motor; and
2. when torques are high, the orders are determined by means of a position sensor. This sensor comprises a disc which is rigidly mounted on the rotor. Three sensing elements may be mounted on the stator, to initiate the firing of each SCR when the pole axis of the rotor takes a given position with respect to the stator coils. The number of lots on the disc is equal to the number of pairs of poles in the rotor and to the geometric angle between sensing elements.

For example, SCRs 168, 170 (FIG. 23) fire to energize coils 24a, 24b (FIG. 1). SCRs 172, 174 fire to energize coils 26a, 26b. SCRs 176, 178 fire to energize coils 28a, 28b. Then, the sequence starts over again.

In this drive circuit, assume that SCRs 176, 178 are "on" and are energizing coils 28a, 28b. A pair of SCR's 168, 170, for example, are switched on responsive to an operation of a microprocessor. The coils 24a, 24b are energized over a circuit traced from d.c. bus 180 through SCR 168, diodes 182, 184, and SCR 170 to d.c. bus 186. The isolation diodes 187, 189 direct the energy in the previously energized coils 28a, 28b into the capacitors 192, 194 which charge and draw the sustaining current from SCRs 176, 178. Since diodes 187, 189 isolate these SCRs from any other sustaining current, they quickly switch off as the capacitors charge. Likewise, the charging of capacitors 192, 194 draws a heavier current through SCRs 168, 170, causing them to switch on faster. Later, the microprocessor fires the SCRs 172, 174, the capacitors 188, 190 charge, rob the SCRs 168, 170 of their sustaining current, and they switch off while SCRs 172, 174 come on faster.

This form of SCR-capacitor control is known; however, the inventive rotor greatly improves the performance of the FIG. 22 circuit. There is a lower overall reactance in the rotor which greatly decreases the voltage across the diode 182, 184, for example, and which enables a use of smaller and lower cost capacitors 188, 190, 192, 194, for example. The lower charge voltage on the capacitor, in turn, reduces the size and cost of the isolation diodes 182, 184. More important, the lower voltage increases the response speed and reliability of the drive circuit.

The drive circuit of FIG. 24 is essentially the same as tee drive circuit of FIG. 23; therefore, the same reference numerals are used to identify the same SCRs in the two drawings. However, unlike the circuit of FIG. 23, the circuit of FIG. 24 starves the SCRs in dependence upon the relatively poorer quadrature reactance $L_q$ (FIG. 5) of the rotor, with the air gaps 44, 46 positioned next to the energized coils. Hence, the capacitors, such as 188–194, and the isolation diodes, such as 182, 184, 187, 189 are not required. Obviously, there is less cost for the FIG. 24 circuit when this many components are eliminated. The more important point is that the drive circuit reacts much quicker when the changing load imposed by the rotation of the rotor, itself, switches off the SCRs.

The drive circuit of FIG. 25 uses a pulse width modulation principle ("PWM") to control the energization of the coils 24–28. In greater detail, each set of coils is separately energized by an associated pair of transistors connected in series across a d.c. bus 196, 198. For example, coils 24a, 24b are energized via transistors 200, 202. In this kind of a drive circuit, a microprocessor calculates the length of a time period that is required to energize each of the coils 24–28 in order to drive the rotor at a desired speed. Then, a PWM inverter control circuit 204 applies a pulse having a width corresponding to the calculated time period to the bases of the appropriate transistors (200, 202 for coils 24).

The advantage of this PWM technique is that the control circuit 204 may apply the pulses to the transistor bases in any sequence in order to turn the rotor in either direction or to brake the turning. The pulses may be applied in any suitable width, to turn the rotor at any suitable speed. The inventive rotor responds so fast that, as a practical matter, the control circuit 204 may make it perform many functions which had only been suggested heretofore as theoretical operations.

Also, there is a greater horsepower output at the driven shaft for the same power input. The horsepower-to-weight ratio is greatly improved. The effective area of the magnetic material is greatly increased because there is less fringing flux, especially at the edges of the magnets. The reduced cross section 82 (FIG. 14) of the core enables a use of thinner magnets 38, 40 since there is now a protection against de-magnetization.

FIG. 27 shows a stack of core laminates 302 stamped from a magnetic material wherein an arcuate window 312 is formed to receive an elongated permanent magnet, with an arcuate cross section, which slides longitudinally therein. This FIG. 27 embodiment is an alternative to the embodiment of FIG. 18 wherein magnetic rods 104 slide through aligned holes formed in the laminates. It is somewhat easier to insert two elongated magnets with somewhat arcuate cross section into windows 312 in a stack of laminates than it is to insert a plurality of separate and independent rods into many individually associated windows. The arcuate air gaps 44, 46 are the same as those gaps which have already been described. Their contours follow the lines of magnetic flux which result from the magnets in the windows 312.

FIG. 28 shows another core made from a stack of laminates which are stamped from magnetic material. The general configuration of the arcuate air gaps 44, 46 are the same as the gaps which have already been described, their contour following the contour of the magnetic flux lines resulting from the permanent magnets in windows 312. Also, each of the arcuate windows 312 receives a correspondingly shaped, elongated magnets having an arculate cross section.

In the areas 314, the laminate has thin connecting members which close the gaps 44, 46 to form a smooth and unbroken outer cylindrical surface for giving a quite aerodynamic shape to the rotor.

It is true that some small amount of magnetic flux will escape from the core proper and pass through the sections 314. However, the limited amount of magnetic material in those sections 314 is kept small so that there is a magnetically saturated condition which greatly limits any loss of flux energy from the core proper. Therefore, the relatively small loss of flux in sections 314 is negligable.

Accordingly, sections 314 act somewhat as if they were steel bands holding the unit together, much as the retainer tube 140 (FIG. 20) holds the rotor together. Also, when it is turning at high speeds the smooth and unbroken surface provided by sections 314 form a smooth aerodynamic surface which prevents noise. If desired, a potting compound may be added to fill the gaps 44, 46.

Those who are skilled in the art will readily perceive how to modify the invention. Therefore, the appended claims are to be construed to cover all equivalent structures which fall within the true scope and spirit of the invention.

The claimed invention is:

1. A brushless rotor device having a driven shaft and comprising a rotor including a core with a generally cylindrical surface, at least a pair of concave air gaps formed on diametrically opposed sides of said core, whereby the portions of said cylindrical surface which are between said air gaps form pole pieces for said rotor, said core being formed to receive permanent magnets in each of a pair of arcuate windows in said laminates, said windows being adjaeent each of said pole pieces for providing at least a pair of magnetic fields in positions which interact with magnetic fields of an adjacent stator, and said concave air gaps having contours which generally follow and conform to the contours of flux lines appearing in said core responsive to said permanent magnets positioned in said pair of windows.

2. The device of claim 1 and elongated permanent magnet means having a cross section corresponding to the contour of said arcuate window and substantially filling the entire area of said windows, said permanent magnet means being mounted in said window.

3. The device of claim 1 wherein said core comprises said stack of laminate plates clamped together in a face-to-face relationship to form said cylindrical surface and said air gaps, and a hole for a shaft passing through a center of said stack of laminates, said hole having a key way formed therein to secure said rotor to a rotable shaft.

4. The device of claim 1 wherein substantially all of said laminate plates have said arcuate window with an arc generally following the circumference of said cylindrical surface.

5. The device of claim 1 wherein said opposed air gaps form a reduced cross section in said core, said cross section having an area which is small enough to go into magnetic saturation only under adverse conditions, thereby protecting said magnets from demagnetization, and said reduced cross section area being large enough not to saturate under normal operating conditions.

6. A device having a driven shaft and comprising a rotor including a core with a generally cylindrical surface made from a stack of circular laminates of magnetic material which are clamped together in alignment; permanent magnet means mounted in aligned windows formed in each laminate near diametrically opposed pole pieces for providing at least a pair of magnetic fields in positions which interact with magnetic fields of an adjacent stator; at least a pair of opposed air gaps formed completely within the perimeter of said circular laminates, on diametrically opposed sides of said core, and between said pole pieces; said air gaps having internal concave contours which follow, correspond, and conform to the contours of flux lines produced by said permanent magnets, the portions of said cylindrical surface which are between said air gaps forming said pole pieces for said rotor and the portions over said air gaps forming an aerodynamically smooth shape, the portion of said laminate over said air gap containing a limited amount of said laminate material to limit magnetic flux therein.

7. The device of claim 6 wherein said permanent magnet means and said windows have an arcuate cross section generally corresponding to the contours of said generally cylindrical surface.

8. The device of claim 6 wherein said portions of said laminate adjacent said air gaps form a streamlined core with a smooth and unbroken cylidrical surface, thereby reducing air drag and noise which might otherwise occur as the rotor turns.

9. The device of claim 6 wherein said laminates have said permanent magnets adjacent but removed from the perimeter of said laminate, thereby forming a buried magnetic layer.

* * * * *